Aug. 25, 1931.  T. E. DIVOKY  1,820,055
GRAIN BEATER SIEVE
Filed Aug. 26, 1929  2 Sheets-Sheet 1

Inventor
Thomas E. Divoky

By Clarence A. O'Brien
Attorney

Aug. 25, 1931.    T. E. DIVOKY    1,820,055
GRAIN BEATER SIEVE
Filed Aug. 26, 1929    2 Sheets-Sheet 2
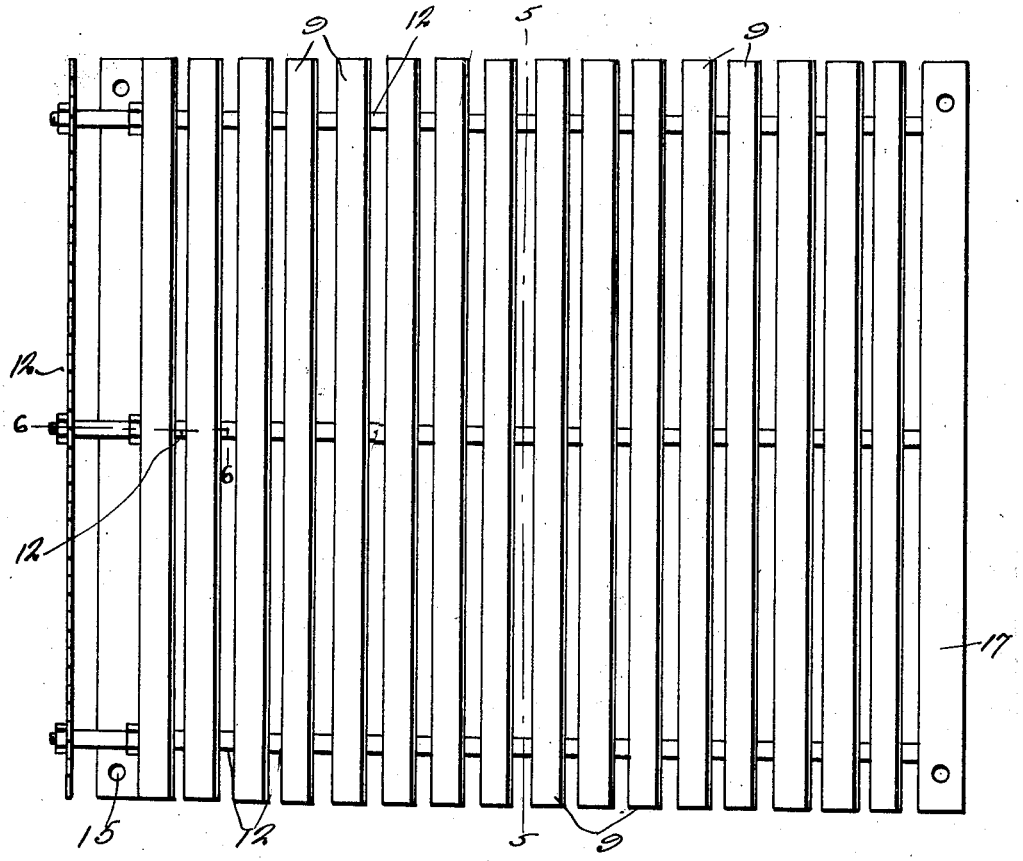
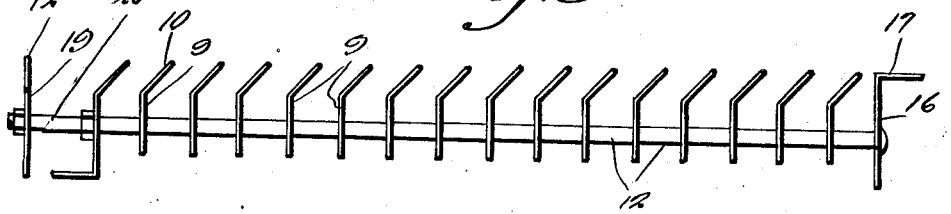
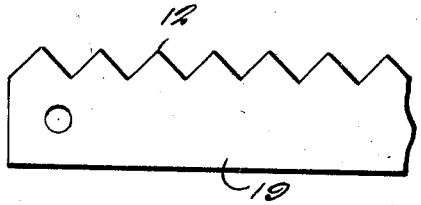
Inventor
Thomas E. Divoky
By Clarence A. O'Brien
Attorney Patented Aug. 25, 1931

1,820,055

UNITED STATES PATENT OFFICE

THOMAS E. DIVOKY, OF WESTERN, NEBRASKA

GRAIN BEATER SIEVE

Application filed August 26, 1929. Serial No. 388,373.

Figure 1:
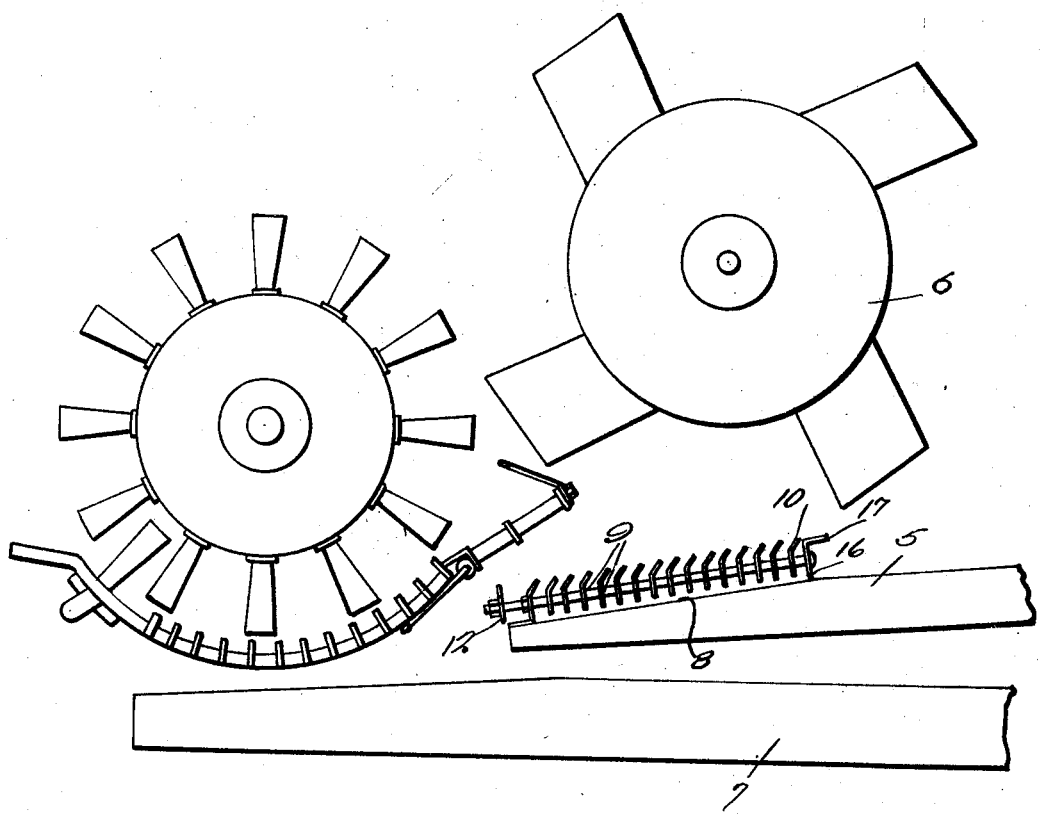
Figure 5:
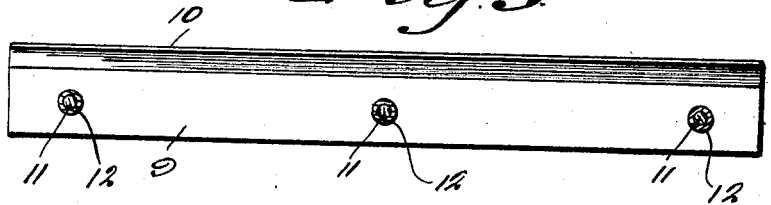
Figure 6:
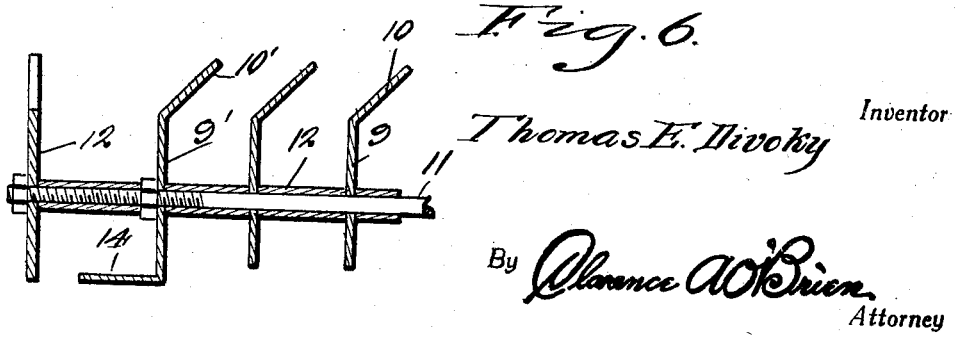

The present invention relates to a beater sieve and the object and advantages thereof will become apparent from a consideration of the following detailed description when taken in connection with the accompanying drawings, wherein:

Figure 1 is a side elevation of the sieve showing the same on the rock above the pan and below the beater, Figure 2 is a top plan view of the sieve, Figure 3 is a side elevation of the sieve, Figure 4 is a detail elevation of the end plate, Figure 5 is a transverse section taken substantially on the line 5—5 of Figure 2, and Figure 6 is a fragmentary longitudinal section taken substantially on the line 6—6 of Figure 2.

Referring to the drawings in detail it will be seen that the numeral 5 denotes the rack with a beater 6 thereabove and a pan 7 therebelow.

The rack 5 is provided with beveled end 8 on which my improved sieve structure is disposed. The sieve comprises a plurality of leaves 9 having oblique extensions 10 on their upper edges. These leaves are disposed in spaced parallelism on rods 11 with spacer sleeves 12 thereon between the leaves and the extensions 10 are also disposed in spaced parallelism with respect to each other.

The end leaf 9′ has an extension 10′ at its upper edge in parallelism with the extensions 10 of the other leaves and at its lower edge is provided with a flange 14 adapted to be fastened to the rack 5, openings 15 being formed in the flange 14 to receive suitable fastening elements. An end plate 16 is mounted on the rods 11 in parallelism with the leaves 9 and has a right angular extension at the upper end thereof.

A plate 19 is mounted on the lower ends of the rods 11 in spaced relation to the end leaf 9′ by means of spacers 20. This plate 19 has its upper edge notched to form teeth 21. This plate 19 prevents the straw from being forced down between the ends of the sieve and the concave and fits as closely to the concave as the motion of the sieve and rack will permit.

This sieve prevents the straw from catching in the sieve itself and choking the flow of straw to the straw rack. This sieve is made to fit upon practically any machine and can be made any width or any length.

This device serves the purposes of a sieve and assists the straw on its course and prevents clogging of the rack especially when wet grain passes through the machine. The device promotes separation of the grain from the straw at the earliest possible moment after the straw leaves the cylinder and by virtue of its end to end motion keeps the straw in motion towards the rear of the machine and at the same time shakes out the grain which falls onto the conveyor and the straw is kept in constant motion so that it is impossible to clog the straw rack.

The leaves by reason of their shape are very efficient in threshing matted and rotten grain as there is nothing to catch the beards and stop the flow of straw, said peculiar shape permitting the same to pass through to the grain pan below the straw racks and throw the straw up on the straw rack.

It will further be seen that the sieve is exceedingly simple in its construction, inexpensive to manufacture and otherwise well adapted to the purpose for which it is designed.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A sieve of the character described comprising a pair of spaced, parallel rods, a series of spaced, parallel plates mounted transversely on the rods, spacing collars mounted on the rods between the plates, the forwardmost of the plates having a forwardly disposed right angular integral extension on its upper edge, the lower edge of said forwardmost plate extending below the plane of the intermediate plates, the remaining plates having formed integrally on their upper edges obtusely disposed, forwardly directed, parallel extensions, the rearmost of the plates extending below the plane of the intermediate plates and, in conjunction with the forwardmost plate, constituting means for supporting same in elevated position, an integral, right angularly disposed flange on the lower edge of the rearmost plate having openings therein for the passage of securing elements for anchoring the sieve on a rack of a threshing machine and a comb plate in spaced parallel relation with the rearmost plate.

In testimony whereof I affix my signature.

THOMAS E. DIVOKY.